(No Model.)
W. H. SNYDER.
SAW MILL DOG.
No. 314,071. Patented Mar. 17, 1885.
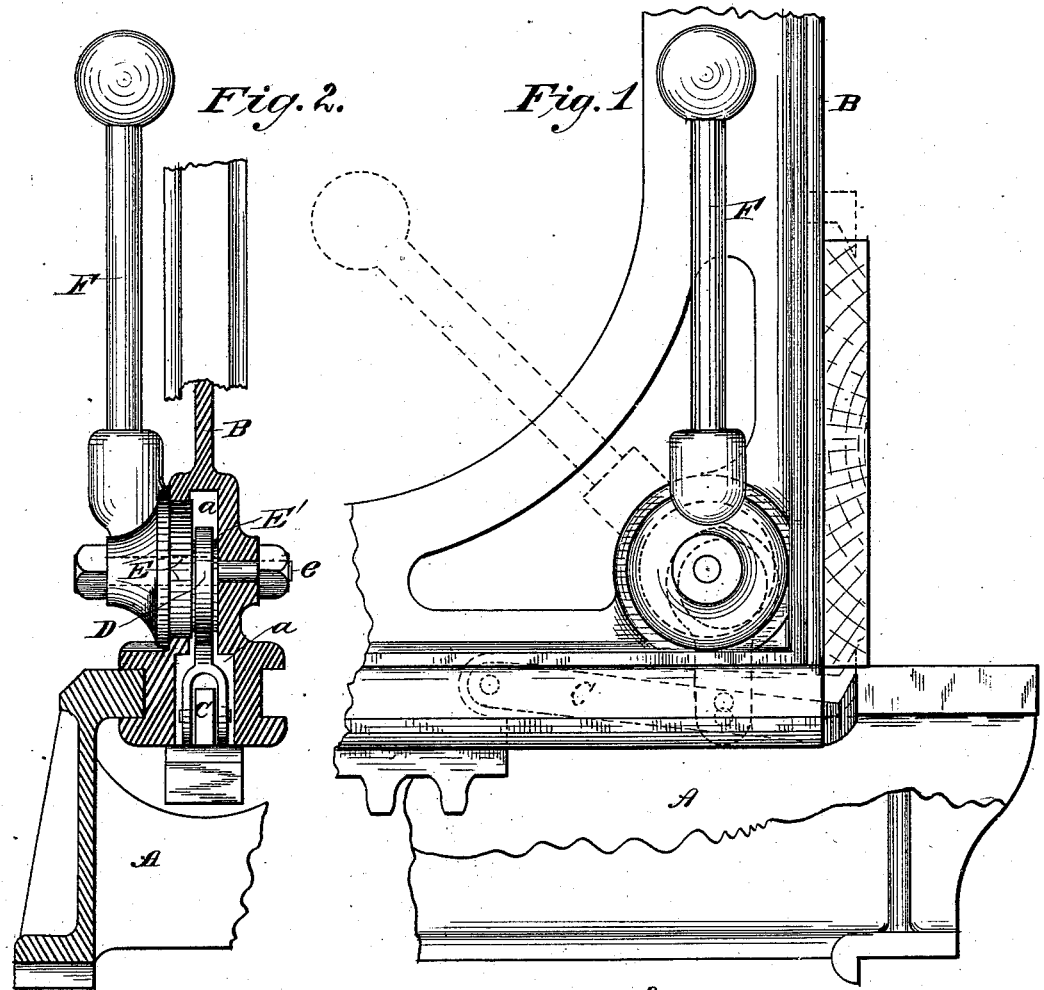
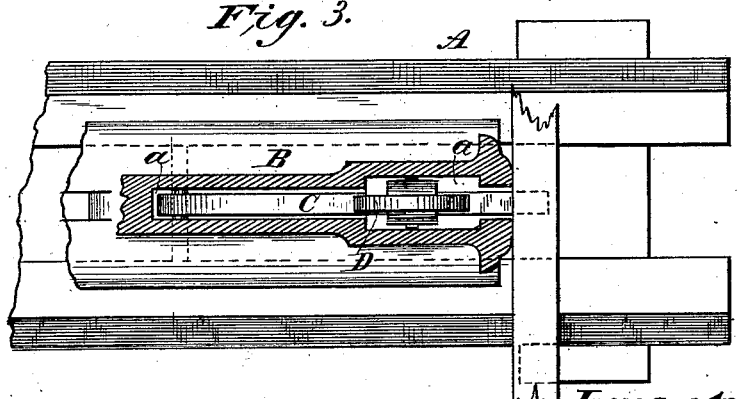
Witnesses:
Edw. T. Walker
W. W. Hannay
Inventor:
William H. Snyder
by his attorney

UNITED STATES PATENT OFFICE.

WILLIAM H. SNYDER, OF WAYNESBOROUGH, PENNSYLVANIA.

SAW-MILL DOG.

SPECIFICATION forming part of Letters Patent No. 314,071, dated March 17, 1885.

Application filed October 18, 1884. (No model.)

*To all whom it may concern:*

Be it known that I, WILLIAM H. SNYDER, a citizen of the United States, residing at Waynesborough, in the county of Franklin and State of Pennsylvania, have invented certain new and useful Improvements in Saw-Mill Dogs; and I do hereby the following to be a full, clear, and exact description of the invention, such as will enable others skilled in the art to which it appertains to make and use the same.

This invention relates to that type of saw-mill head-blocks wherein an under dog is provided as well as an upper dog, so that the log or board may be held at the bottom as well as at the top.

The object of my improvement is to so arrange the under dog that it will be entirely out of the way and to provide a strong and compact mechanism for operating it.

My improvement consists in arranging this under dog in a chamber or recess formed in the head-block, and combining it with an eccentric and eccentric-rod for raising and lowering it, all as will be described in detail in the following description, aided by the annexed drawings, and specifically pointed out in the claim at the close of this specification.

Figure 1 is an end elevation showing sufficient of a saw-mill head-block to illustrate the nature and application of my invention. Fig. 2 is a vertical section thereof. Fig. 3 is a horizontal section, the eccentric being omitted.

The same letters of reference indicate identical parts in all the figures.

The head-block B is mounted crosswise of the log-carriage in the ordinary manner. The head-block is cored out so as to form a chamber or recess, a. The under dog, C, is arranged in the lower portion of this recess. The dog is pivoted to the head-block at c, and projects with its claw beyond the face of the knee thereof. The dog is also pivoted to the forked lower end of the eccentric-rod D, the upper end of which is constructed with a strap to encircle the eccentric E'. This eccentric is formed on the inner face of a circular disk, E, which is fitted to turn in a bearing-eye in one side of the head-block. A flanged head forming the outer face of disk E is provided with a tubular boss for the attachment of a handle, F. The disk E, eccentric E', and handle F may be cast all in one piece. The disk E and its eccentric are held in place on the head-block by a bolt, e; but the strain to which the eccentric is subjected in forcing the dog into a log or board is borne by the disk E, not by bolt e. The eccentric is so set on disk E that when the handle F is in the position shown by full lines in Fig. 1 the under dog is out of action. To bring the dog into action, the handle is turned to the position shown by dotted lines in Fig. 1, whereby the eccentric is turned so as to raise the eccentric-rod and through it the outer end of the dog.

I am aware that a saw-mill dog has been combined with an eccentric and an eccentric strap and rod for operating it. I therefore do not claim this broadly, nor do I claim other parts separately considered. It is only the association and arrangement or mode of application hereinbefore described of all the parts as set forth in the following claim which I believe to be new and know to be useful.

I claim as my invention—

The combination, substantially as before set forth, of the saw-mill head-block constructed with a chamber, the under dog pivoted to the head-block within said chamber, the eccentric in said chamber above the dog and journaled in the side of the head-block, and the eccentric rod and strap for connecting the pivoted dog with the eccentric.

In testimony whereof I affix my signature in presence of two witnesses.

WILLIAM H. SNYDER.

Witnesses:
   D. M. GOOD, Jr.,
   EZRA FRICK.